(12) United States Patent
Saad et al.

(10) Patent No.: US 11,093,176 B2
(45) Date of Patent: Aug. 17, 2021

(54) FAAS-BASED GLOBAL OBJECT COMPRESSION

(71) Applicant: EMC IP Holding Company LLC, Hopkinton, MA (US)

(72) Inventors: Yossef Saad, Gannei Tikva (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 71 days.

(21) Appl. No.: 16/396,499

(22) Filed: Apr. 26, 2019

(65) Prior Publication Data

US 2020/0341690 A1 Oct. 29, 2020

(51) Int. Cl.
*G06F 3/06* (2006.01)
*H04L 29/08* (2006.01)

(52) U.S. Cl.
CPC ............ *G06F 3/0661* (2013.01); *G06F 3/067* (2013.01); *G06F 3/0608* (2013.01); *H04L 67/1097* (2013.01)

(58) Field of Classification Search
CPC ...... G06F 3/0661; G06F 3/067; G06F 3/0608; H04L 67/1097
See application file for complete search history.

(56) References Cited

U.S. PATENT DOCUMENTS

| | | | | |
|---|---|---|---|---|
| 8,914,338 B1 * | 12/2014 | Wallace | ................ | G06F 3/0608 707/693 |
| 8,935,487 B2 * | 1/2015 | Sengupta | .............. | G06F 16/137 711/154 |
| 9,244,623 B1 * | 1/2016 | Bent | ..................... | G06F 3/0641 |
| 9,367,557 B1 * | 6/2016 | Lin | ...................... | G06F 16/1744 |
| 9,727,573 B1 * | 8/2017 | Wallace | .................. | G06F 16/11 |
| 9,971,526 B1 * | 5/2018 | Wei | ....................... | G06F 3/0619 |
| 2014/0181465 A1 * | 6/2014 | Baldwin | ............... | G06F 3/0604 711/216 |
| 2015/0324123 A1 * | 11/2015 | Storer | ................... | G06F 3/0689 714/6.24 |
| 2017/0199707 A1 * | 7/2017 | Varghese | .............. | G06F 3/0688 |
| 2020/0012569 A1 * | 1/2020 | Natanzon | ............ | G06F 16/2255 |
| 2020/0301595 A1 * | 9/2020 | Akutsu | ................. | G06F 3/0605 |

OTHER PUBLICATIONS

Michael Behrendt "Serverless Computing: Customer Adoption Insights & Patterns," Second International Workshop on Serverless Computing (WoSC) 2017, part of Middleware 2017, Nov. 25, 2017 pp. 1-35. (Year: 2017).*

* cited by examiner

*Primary Examiner* — Francisco A Grullon
(74) *Attorney, Agent, or Firm* — Womble Bond Dickinson (US) LLP

(57) ABSTRACT

A method, apparatus, and system for compressing a data object for storage at an object store of a cloud computing platform using a global compression scheme is disclosed. The operations comprise: receiving a new data object for storage in an object store on a cloud computing platform; dividing the new data object into a plurality of chunks of a predetermined size; for each chunk of the new data object, determining a respective most similar existing chunk already stored in the object store; compressing the new data object, comprising compressing each chunk of the new data object based on the respective most similar existing chunk as a compression reference; and storing the compressed new data object in the object store.

21 Claims, 5 Drawing Sheets

FAAS-BASED GLOBAL OBJECT COMPRESSION

FIELD OF THE INVENTION

Embodiments of the present invention relate generally to data storage systems. More particularly, embodiments of the invention relate to data compression at a cloud storage service.

BACKGROUND

There is a significant growth in the amount of data stored in the public cloud object storage, such as the Amazon Web Services (AWS) S3 service (Simple Storage Service). Customers are paying high monthly fees to store this data, and are looking for effective ways to reduce the amount of storage they consume without complicated operational processes. While compression can significantly reduce object sizes, it does not leverage the fact that different objects may have significant amounts of similar data. The deduplication technique can be used to find some of the similarity between different objects, but its compression rates tend to be less than optimal.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
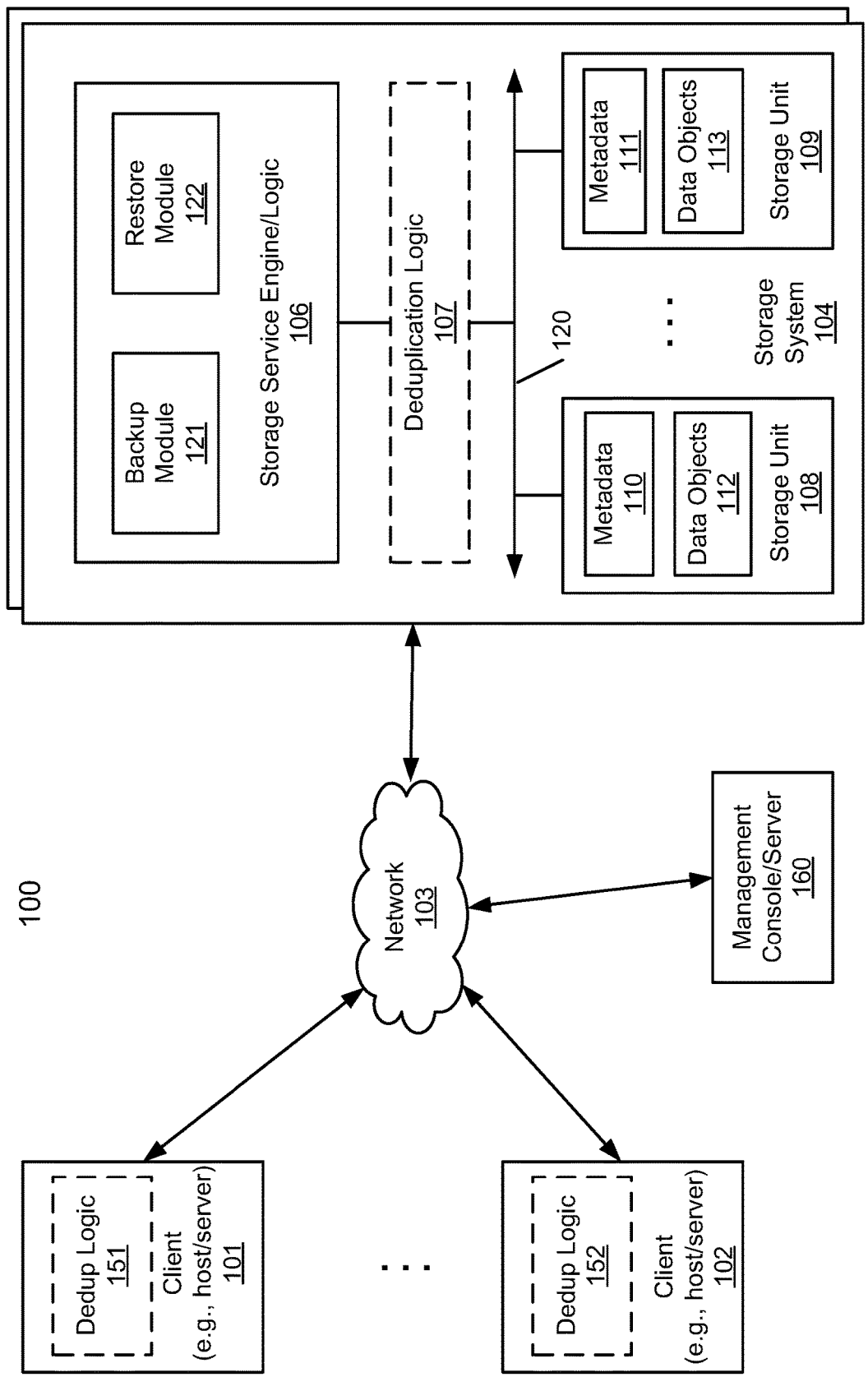
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, apparatus, and system for compressing a data object for storage at an object store of a cloud computing platform using a global compression scheme. A new data object is received for storage in an object store on a cloud computing platform. Next, the new data object is divided into a plurality of chunks of a predetermined size. Next, for each chunk of the new data object, a respective most similar existing chunk already stored in the object store is determined. Next, the new data object is compressed, comprising compressing each chunk of the new data object based on the respective most similar existing chunk as a compression reference. Thereafter, the compressed new data object is stored in the object store.

In one embodiment, the respective most similar existing chunk already stored in the object store is determined for each chunk of the new data object based on a similarity indicator for the chunk of the new data object and respective similarity indicators for existing chunks already stored in the object store.

In one embodiment, a similarity indicator for a chunk comprises a first number (n) of hash values.

In one embodiment, the hash values that make up the similarity indicator for a chunk comprise largest n hash values out of a plurality of rolling hash values calculated for rolling fixed-sized sub-chunks of the chunk.

In one embodiment, an existing chunk already stored in the object store that shares a largest number of hash values with the chunk of the new data object in their respective similarity indicators is determined as the most similar existing chunk to the chunk of the new data object.

In one embodiment, in response to a request to retrieve the new data object, the compressed new data object is decompressed to obtain the new data object in an uncompressed form using the respective most similar existing chunks used as compression references.

In one embodiment, the receiving, the dividing, the determining, the compressing, and the storing are performed at a Function-as-a-Service (FaaS) module of the cloud computing platform.

In one embodiment, the most similar existing chunks are found among existing chunks that belong in a same bucket or belong to a same customer.

In one embodiment, the similarity indicators are stored as key/value pairs in a key value store of the cloud computing platform.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Data compression is a well-known technique to reduce the number of bytes used to store a certain amount of data. It leverages a dictionary that maps long streams of bytes to keys. The dictionary is associated with the compressed data, so the resulting compressed file includes the dictionary and the stream of keys that represent the segments of the data. The data can be reconstructed (decompressed) by replacing each key in the data stream with the data piece it represents. One popular compression technique used for file compression is Lempel-Ziv-Welch (LZW). Since most files or data streams include repetitions, the resulting stream of "keys" is smaller in size than the stream of data. However, on one hand, the dictionary itself takes space, but on the other hand, the larger the dictionary, the more efficient would be the compression.

More and more data is stored on public cloud object storage (e.g., the Simple Storage Service "S3" offered by AWS), and this is expected to grow at a 14% annual rate, up to $6B in 2023. This amount of data is being used by customers who pay a lot for it, and the customers would like to reduce their monthly payments. However, when customers store data in an object storage, conventionally they cannot compress the data in an efficient manner that takes into consideration the overall data that they store in the bucket or the whole account. For example, customer applications typically write data directly to the object storage (e.g. using the "S3 protocol"), and do not have a proper way to compress it. Even if the data is compressed at the source (e.g. a database that is compressing data at the application level), the compression is done per object, and the dictionary is restarted and is independent between objects. This means the customers do not benefit from any efficiency they could potentially get thanks to the larger scale they have.

In one embodiment, global compression, i.e., compression that leverages similarity between objects that are not identical, may be used. Much higher rates of compression can be achieved with global compression than those associated with the conventional intra-object compression. One embodiment relates to a Function-as-a-Service (FaaS; a.k.a. Serverless architecture) that globally compresses objects, i.e. compresses objects while leveraging pieces of other objects that the same customer has as references without requiring special intervention from the customer, so that the customer may pay the cloud provider (e.g., AWS) only a fraction of the amount without changing their operating model.

FaaS (Function-as-a-Service) can be defined as a category of cloud computing services that provides a platform allowing customers to develop, run, and manage application functionalities without the complexity of building and maintaining the infrastructure typically associated with developing and launching an app. Vendors such as AWS, Google, Microsoft, and IBM all have their own FaaS offerings.

Figure 2:
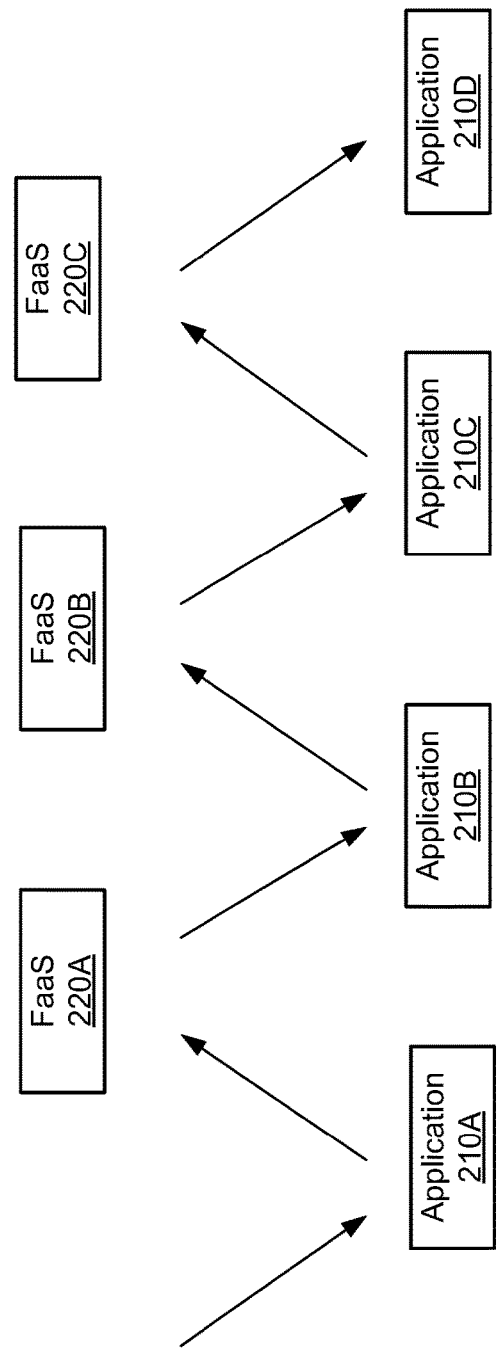
FIG. 2 is a diagram illustrating an example environment for a chain of FaaS execution according to one embodiment.

Referring to FIG. 2, a diagram illustrating an example environment 200 for a chain of FaaS execution according to one embodiment is shown. The applications 210A-D and the FaaS modules 220A-C may be executed at a cloud computing platform. It should be appreciated that FIG. 2 is for illustrative purposes only, and the number of applications and/or FaaS modules and their relationships as illustrated in FIG. 2 do not limit the disclosure. A first application 210A (e.g., an object store) receives an input, which triggers a first function call from the first application 210A to a first FaaS module 220A. The first FaaS module 220A returns a first result in response, which is provided to a second application 210B (e.g., an SQL database). Similarly, the second application 210B is triggered and invokes a second function call to a second FaaS module 220B. The second FaaS module 220B then returns a second result in response, which is provided to a third application 210C (e.g., a NoSQL database). In a similar fashion, the third application 210C invokes a third function call to a third FaaS module 220C, which, in response, returns a third result to a fourth application 210D.

One embodiment relates to performing global object compression as a service implemented as a FaaS in the cloud. This means that the customer will need to pay for the storage consumed and for database services for storing some metadata, but the compute will only be charged when an object is stored or retrieved. By utilizing FaaS for this purpose, significant cost savings can be achieved as the implementation of global compression for object storage is optimized for the pricing model of the cloud.

The system may expose an interface identical to a standard cloud object storage interface (e.g., the AWS S3 interface) (for AWS, this can be achieved by leveraging Amazon Application Programming Interface "API" gateway-based functions). The global compression FaaS may work in the background, and may be transparent to applications that utilize the cloud storage. In other words, the application that stores data to and retrieves data from the cloud storage may not be aware of the compression function, and may store and retrieve data using the standard cloud object storage interface. Once the function is called for storing object in the cloud storage, the compression process may start and the compressed object may be stored. And when a function to retrieve an object is called, the compressed object will be read from the cloud storage, and the decompression process may start.

The compression function may first divide the object into plurality of data chunks size a predetermined size. The size of the data chunks may be determined empirically. For each chunk a similarity indicator may be calculated and stored. An example of a similarity indicator may be found by first calculating a rolling hash for sub-chunks of the chunk that have a fixed size, and then keeping only a predetermined number (n) of largest hash values as the similarity indicator.

For example, assume the chunk size is 64000 bytes, n is 4 (i.e., the 4 largest hash values are kept as the similarity indicator), and the rolling hash is calculated for sub-chunks that are 1000 bytes in size. In this example, for each starting point of the chunk from offset 0 to offset 62999, a hash of the 1000 following bytes may be calculated (i.e., 63000 hashes are calculated for the chunk). Among the 63000 hashes, only the 4 hashes with the highest values are kept as the similarity indicator for the chunk.

The similarity indicator may then be stored in a key value store (e.g., DynamoDB offered by AWS, Cosmos DB offered by Microsoft Azure, etc.) as key/value pairs. Each hash value kept as part of the similarity indicator may be associated with an identifier (id) of the corresponding new chunk, and may correspond to one key/value pair in the key value store, where the key is the hash value, and the value comprises the remaining hash values kept as part of the similarity indicator. Returning to the above example, 4 key/value pairs may be stored, where the key in each key/value pair is one of the 4 hash values, and the value comprises the rest of the 3.

If a hash value does not already exist in the key value store, a new key/value pair may be created and stored, together with the identifier of the corresponding new chunk. If a key/value pair corresponding to the hash value already exists, the new chunk identifier as well as the other hashes (if new) may be added to the value of the corresponding key/value pair. In one embodiment, the number of chunk references each key points to may be limited. For example, a Least Recently Used (LRU) metric may be used to drop one or more hash values that have not been recently used from the value part of the key/value pair if addition of new hash values would cause the number of references to exceed the limit.

Thereafter, the most similar already-existing chunk to the new chunk may be determined based on the values of the keys that correspond to the new object. In particular, the already-existing chunk that shares the most hash values in its similarity indicator with the new object may be determined as the most similar already-existing chunk. Returning to the above example, a first already-existing chunk that shares 4 out of the 4 hash values in the similarity indicator with the new chunk is determined as being more similar to the new chunk than a second already-existing chunk that shares only 3 out of the 4 hash values in the similarity indicator with the new chunk.

Once the most similar chunk is found, it may be read from the object store based on its identifier, and used as a reference for a compression algorithm applied to the new chunk (e.g., the 64000-byte new chunk in the above example). If the chunks are indeed similar, the compression ratio would tend to be very high. The compressed new chunk may then be written to the object store.

When the customer attempts to retrieve an object that comprises at least one compressed chunk, a function call to the global compression FaaS may be triggered by the API gateway. The customer application that attempts to retrieve the object may not be aware of the existence of the global compression FaaS, and may request the retrieval of the object by sending a standard command (e.g., a GET command) to the API gateway. The compressed chunks, together with the chunks that they reference (and the chunks that the referenced chunks reference, if any, etc.) may be read, and the referenced chunks may be leveraged for decompression.

To illustrate the efficiency of the global compression scheme described above, an object that is 1 MB (i.e., 1024 kB) in size may be used as an example here. Also it is assumed that in every version the amount of changes to the object is about 10%, i.e., 102 kB. Without global compression, every version of the object would consume 1024 kB of storage space. With global compression, unchanged blocks in the object would be replaced with pointers (e.g., of 512 bytes in length each). With the changed data (occupying 102 kB in total) added, the compressed version would consume only approximately 110 kB of storage space, which is only 11% of the original size, thus saving 89% of the storage space and cost.

Figure 3:
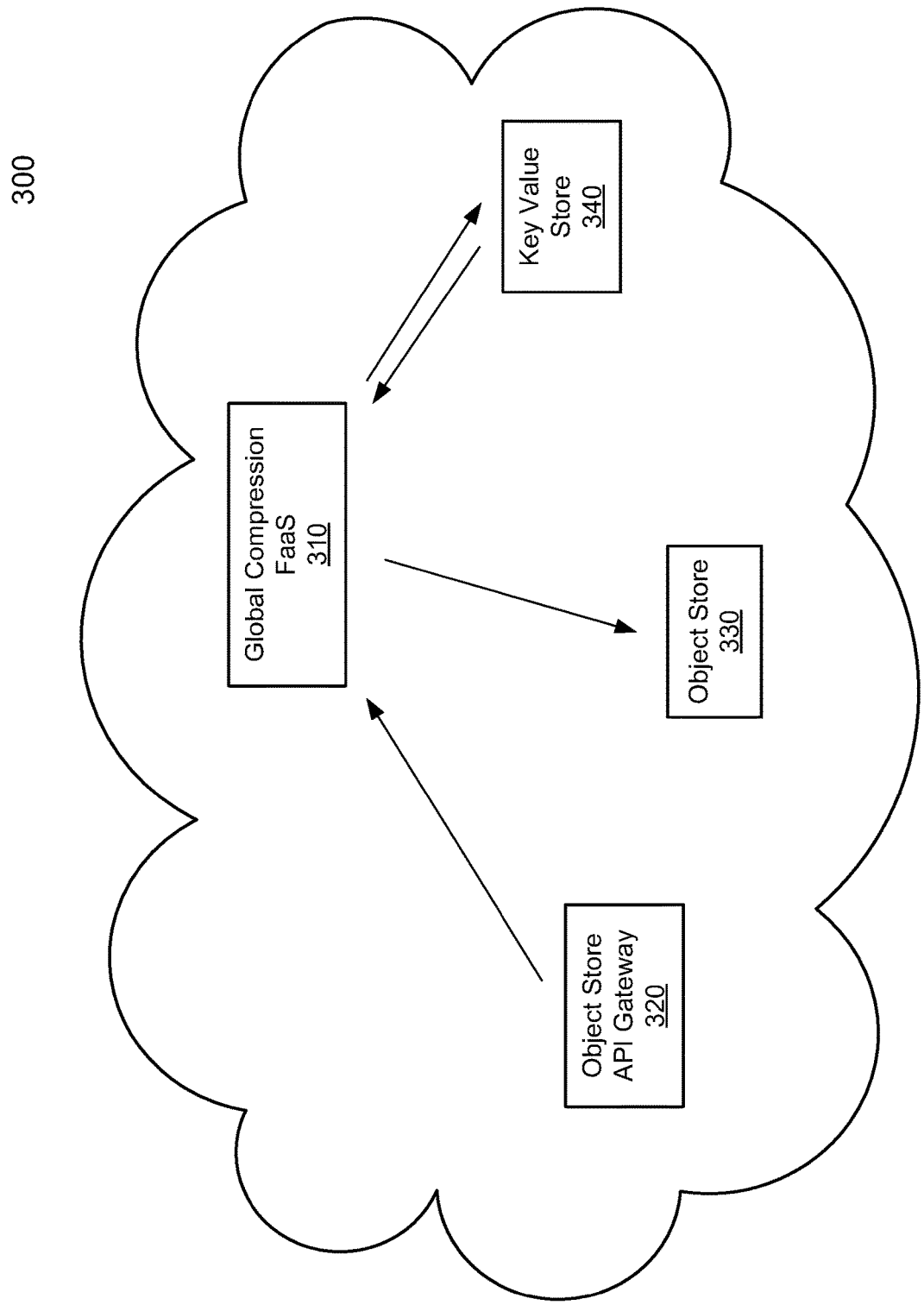
FIG. 3 is a block diagram illustrating various components of a global compression system according to one embodiment.

Referring to FIG. 3, a block diagram 300 illustrating various components of a global compression system according to one embodiment is shown. When a customer application makes a request to store an object through the object store API gateway 320, a function call to the global compression FaaS 310 is triggered by the API gateway 320 to initiate compression of the new object. The customer application may not be aware of the existence of the global compression FaaS 310, and may make the request with a standard command (e.g., a PUT command). The global compression FaaS 310 may determine the most similar already-existing chunk(s) to the chunk(s) of the new object using the key value store 340 (e.g., based on the similarity indicator, as described above). The key value store may be a cached/in-memory data store (e.g., ElastiCache offered by AWS) to improve performance. The global compression FaaS 310 then compresses the new object using the determined similar already-existing chunk(s) as references. Thereafter, the compressed object may be stored in the object store 330.

Figure 4:
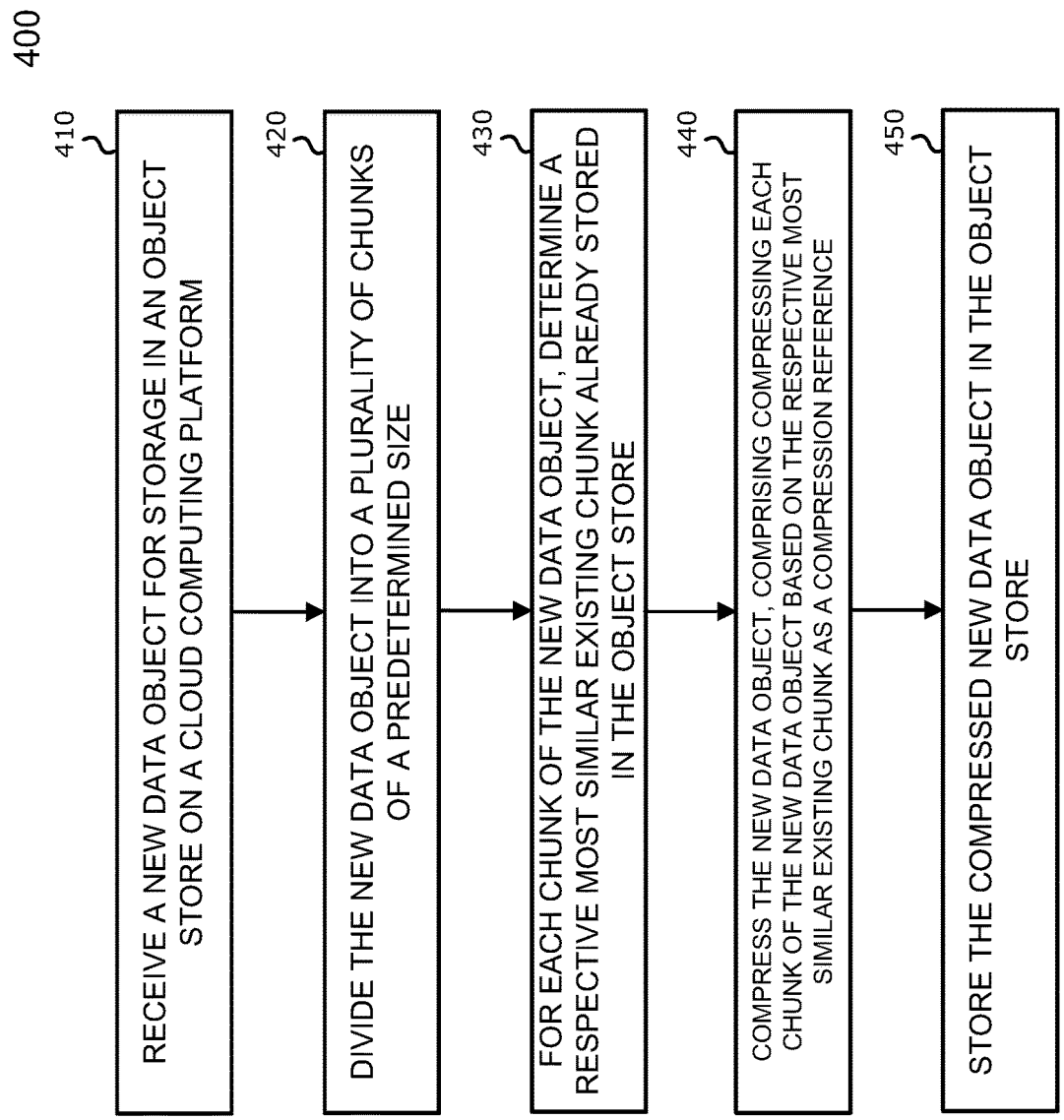
FIG. 4 is a flow diagram illustrating a process of compressing a data object with a global compression scheme according to one embodiment.

FIG. 4 is a flow diagram illustrating a process 400 of compressing a data object with a global compression scheme according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by processor(s) 1501 of FIG. 5. Referring to FIG. 4, at block 410, a new data object is received for storage in an object store on a cloud computing platform. At block 420, the new data object is divided into a plurality of chunks of a predetermined size. At block 430, for each chunk of the new data object, a respective most similar existing chunk already stored in the object store is determined. At block 440, the new data object is compressed, comprising compressing each chunk of the new data object based on the respective most similar existing chunk as a compression reference. At block 450, the compressed new data object is stored in the object store.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments relate to a global compression scheme that leverages data chunks already stored in the object store as compression references to compress new data objects to be stored in the object store. Significant storage space and thus cost savings can be achieved when a customer of the cloud platform stores data objects that may be similar to each other to various degrees. As the scheme is implemented as a FaaS module, no special intervention is required of the customer.

Figure 5:
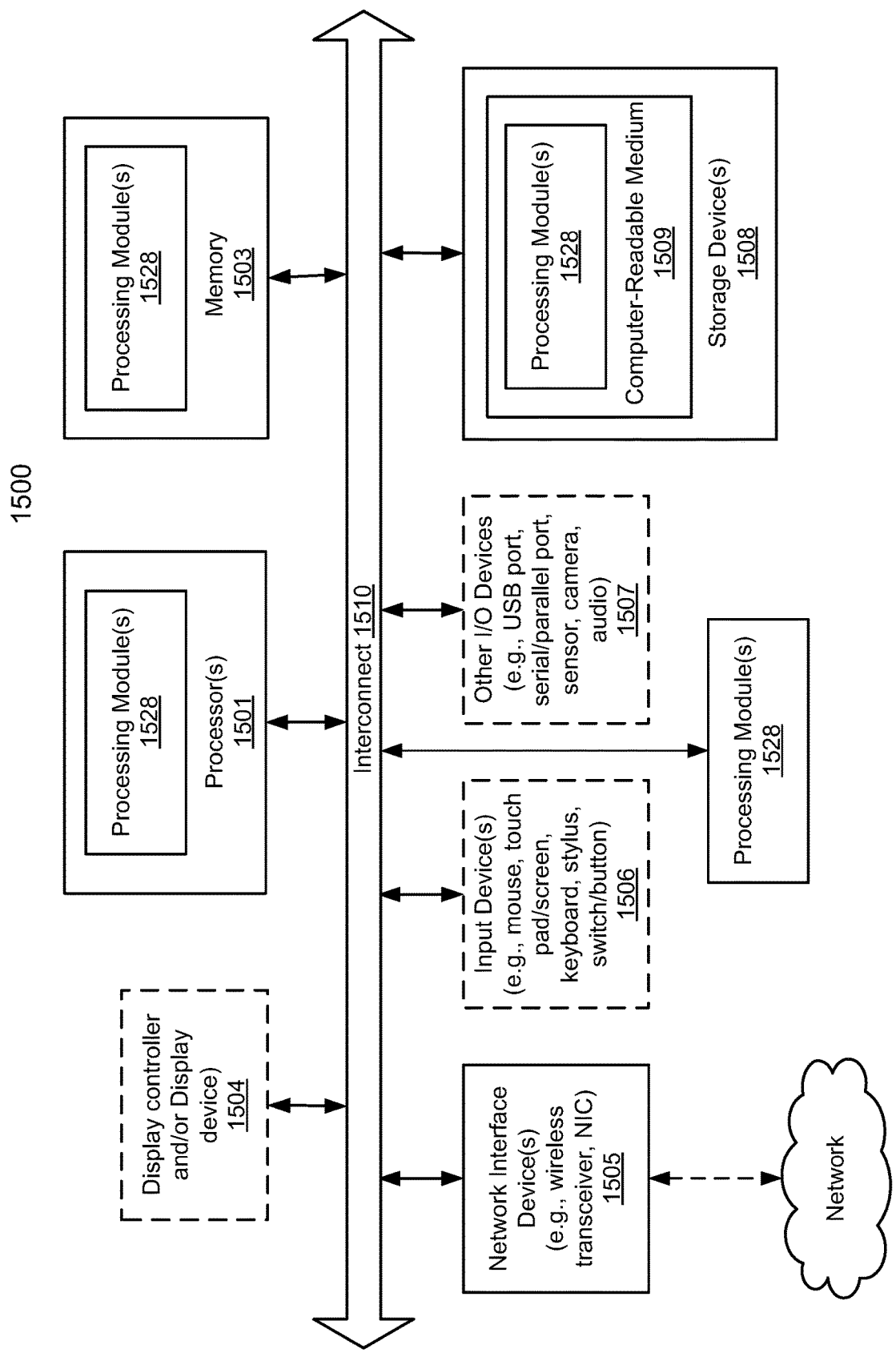
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a FaaS module, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a new data object for storage in an object store on a cloud computing platform;
   dividing the new data object into a plurality of chunks of a predetermined size;
   for each chunk of the new data object, determining a respective most similar existing chunk already stored in the object store based on a similarity indicator stored in a key value store of the cloud computing platform, including:
   determining whether a hash value already exists in the key value store,
   in response to determining that the hash value does not already exist in the key value store, generating a new key-value pair corresponding to the similarity indicator, wherein a key of the key-value pair is a key hash value, and wherein a value of the key-value pair comprises a remaining hash value kept as part of the similarity indictor;
   compressing the new data object, comprising compressing each chunk of the new data object based on the respective most similar existing chunk as a compression reference; and
   storing the compressed new data object in the object store.

2. The method of claim 1, wherein the respective most similar existing chunk already stored in the object store is determined for each chunk of the new data object based on the similarity indicator for the chunk of the new data object and respective similarity indicators for existing chunks already stored in the object store.

3. The method of claim 2, wherein the similarity indicator for a chunk comprises a first number (n) of hash values.

4. The method of claim 3, wherein the hash values that make up the similarity indicator for the chunk comprise largest n hash values out of a plurality of rolling hash values calculated for rolling fixed-sized sub-chunks of the chunk.

5. The method of claim 3, wherein an existing chunk already stored in the object store that shares a largest number of hash values with the chunk of the new data object in their respective similarity indicators is determined as the most similar existing chunk to the chunk of the new data object.

6. The method of claim 1, further comprising: in response to a request to retrieve the new data object, decompressing the compressed new data object to obtain the new data object in an uncompressed form using the respective most similar existing chunks used as compression references.

7. The method of claim 1, wherein the receiving, the dividing, the determining, the compressing, and the storing are performed at a Function-as-a-Service (FaaS) module of the cloud computing platform.

8. A non-transitory machine-readable medium having instructions stored therein, which when executed by a processor, cause the processor to perform data storage operations, the operations comprising:
   receiving a new data object for storage in an object store on a cloud computing platform;
   dividing the new data object into a plurality of chunks of a predetermined size;
   for each chunk of the new data object, determining a respective most similar existing chunk already stored in the object store based on a similarity indicator stored in key value store of the cloud computing platform, including:
   determining whether a hash value already exists in the key value store,
   in response to determining that the hash value does not already exist in the key value store, generating a new key-value pair corresponding to the similarity indicator, wherein a key of the key-value pair is a key hash value, and wherein a value of the key-value pair comprises a remaining hash value kept as part of the similarity indictor;
   compressing the new data object, comprising compressing each chunk of the new data object based on the respective most similar existing chunk as a compression reference; and
   storing the compressed new data object in the object store.

9. The non-transitory machine-readable medium of claim 8, wherein the respective most similar existing chunk already stored in the object store is determined for each chunk of the new data object based on the similarity indicator for the chunk of the new data object and respective similarity indicators for existing chunks already stored in the object store.

10. The non-transitory machine-readable medium of claim 9, wherein the similarity indicator for a chunk comprises a first number (n) of hash values.

11. The non-transitory machine-readable medium of claim 10, wherein the hash values that make up the similarity indicator for the chunk comprise largest n hash values out of a plurality of rolling hash values calculated for rolling fixed-sized sub-chunks of the chunk.

12. The non-transitory machine-readable medium of claim 10, wherein an existing chunk already stored in the object store that shares a largest number of hash values with the chunk of the new data object in their respective similarity indicators is determined as the most similar existing chunk to the chunk of the new data object.

13. The non-transitory machine-readable medium of claim 8, the operations further comprising: in response to a request to retrieve the new data object, decompressing the compressed new data object to obtain the new data object in an uncompressed form using the respective most similar existing chunks used as compression references.

14. The non-transitory machine-readable medium of claim 8, wherein the receiving, the dividing, the determining, the compressing, and the storing are performed at a Function-as-a-Service (FaaS) module of the cloud computing platform.

15. A data processing system, comprising:
a processor; and
a memory coupled to the processor to store instructions, which when executed by the processor, cause the processor to perform data storage operations, the operations including:
receiving a new data object for storage in an object store on a cloud computing platform;
dividing the new data object into a plurality of chunks of a predetermined size;
for each chunk of the new data object, determining a respective most similar existing chunk already stored in the object store based on a similarity indicator stored in key value store of the cloud computing platform, including:
determining whether a hash value already exists in the key value store,
in response to determining that the hash value does not already exist in the key value store, generating a new key-value pair corresponding to the similarity indicator, wherein a key of the key-value pair is a key hash value, and wherein a value of the key-value pair comprises a remaining hash value kept as part of the similarity indictor;
compressing the new data object, comprising compressing each chunk of the new data object based on the respective most similar existing chunk as a compression reference; and
storing the compressed new data object in the object store.

16. The data processing system of claim 15, wherein the respective most similar existing chunk already stored in the object store is determined for each chunk of the new data object based on the similarity indicator for the chunk of the new data object and respective similarity indicators for existing chunks already stored in the object store.

17. The data processing system of claim 16, wherein the similarity indicator for a chunk comprises a first number (n) of hash values.

18. The data processing system of claim 17, wherein the hash values that make up the similarity indicator for the chunk comprise largest n hash values out of a plurality of rolling hash values calculated for rolling fixed-sized sub-chunks of the chunk.

19. The data processing system of claim 17, wherein an existing chunk already stored in the object store that shares a largest number of hash values with the chunk of the new data object in their respective similarity indicators is determined as the most similar existing chunk to the chunk of the new data object.

20. The data processing system of claim 15, the operations further comprising: in response to a request to retrieve the new data object, decompressing the compressed new data object to obtain the new data object in an uncompressed form using the respective most similar existing chunks used as compression references.

21. The data processing system of claim 15, wherein the receiving, the dividing, the determining, the compressing, and the storing are performed at a Function-as-a-Service (FaaS) module of the cloud computing platform.

* * * * *